United States Patent [19]

Mercier

[11] Patent Number: 4,610,369

[45] Date of Patent: Sep. 9, 1986

[54] PRESSURE VESSEL

[76] Inventor: Jacques H. Mercier, 14 rue des Sablons, 75116 Paris, France

[21] Appl. No.: 785,340

[22] Filed: Oct. 7, 1985

[51] Int. Cl.[4] .............................................. F16L 55/00

[52] U.S. Cl. ................................... 220/85 B; 60/415; 92/92; 138/30

[58] Field of Search ....................... 92/92, 93; 138/30; 417/540; 137/209, 802; 60/415, 593; 220/85 B

[56] References Cited

U.S. PATENT DOCUMENTS

| | | | |
|---|---|---|---|
| 1,389,635 | 9/1921 | Dunkle | 92/92 X |
| 2,828,769 | 4/1958 | Cooper | 138/30 |
| 2,841,181 | 7/1958 | Hewitt et al. | 138/30 |
| 2,924,359 | 2/1960 | Beremand | 220/85 B |
| 3,195,577 | 7/1965 | Greer | 138/30 |
| 3,276,478 | 10/1966 | Bleasdale | 92/93 X |
| 3,322,154 | 5/1967 | Mercier | 138/30 |
| 3,741,250 | 6/1973 | Mercier | 138/30 |
| 3,744,527 | 7/1973 | Mercier | 138/30 |

FOREIGN PATENT DOCUMENTS

| | | | |
|---|---|---|---|
| 1298795 | 7/1969 | Fed. Rep. of Germany | 138/30 |

*Primary Examiner*—Stephen Marcus
*Assistant Examiner*—Mark Thronson
*Attorney, Agent, or Firm*—Arthur B. Colvin

[57] ABSTRACT

A pressure vessel comprising a rigid container having a deformable partition therein defining two chambers for fluid, each having a fluid port leading thereinto with an elongated apertured central guide tube for said partition extending axially in said container having at least one end secured to one of said ports. A flexible closure member encompasses said guide tube and the apertures thereof, said closure member having a plurality of closure elements normally extending radially outward from said tube, each closure element comprising a pair of spaced walls joined at their outer ends, one of said walls having apertures therethrough.

12 Claims, 7 Drawing Figures

FIG. 5
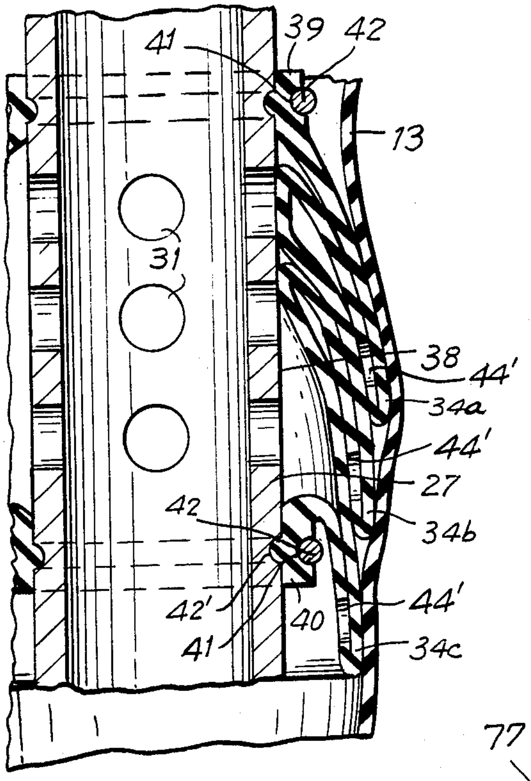
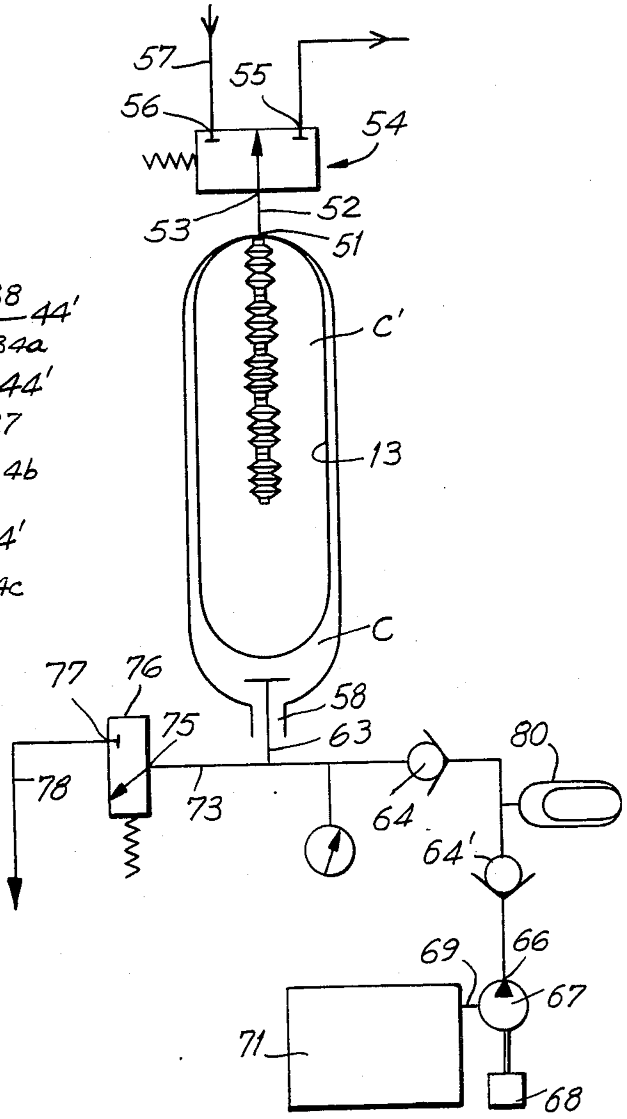
FIG. 6
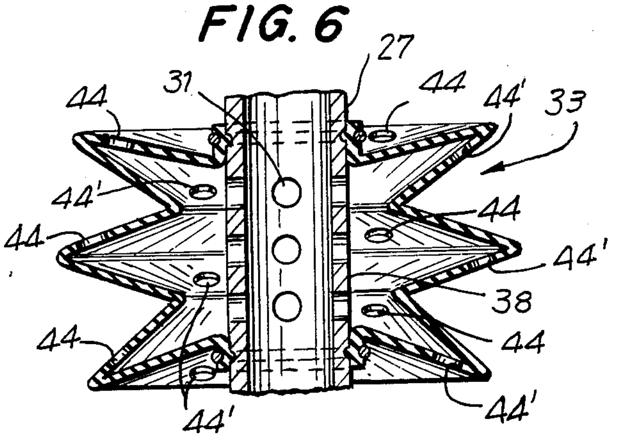
FIG. 7

PRESSURE VESSEL

This invention relates to the art of pressure vessels, more particularly of the type having a pair of ports for charging and discharging thereof with two fluids and having a deformable partition therein separating such fluids, and more particularly for use of the device as a transfer barrier allowing large flow in at least one direction.

As conducive to an understanding of the invention, it is noted that where such pressure vessel are of a large size and the partition is an elongated bladder or sleeve and the chamber defined by the interior portion of the rigid shell of the pressure vessel exteriorly of the bladder is charged through one of the ports with a fluid such as water under pressure which serves to deform the bladder inwardly, and the chamber defined by the interior of the bladder contains a fluid such as gas, the gas must be expelled from the bladder during charging of the pressure vessel, to permit full inward deformation of the bladder so that charging of the pressure vessel to its full capacity can be obtained.

In addition, if the gas is fully expelled permitting full inward deformation of the bladder, this would cause twisting of the bladder with resultant sharp folds therein with resulting possibility of rupture of the bladder.

Where, to permit emptying of the bladder of the gas contained therein with resultant full filling of the pressure vessel with liquid and also to prevent twisting of the bladder with resultant sharp folds, a rigid guide member is positioned in the bladder with one end secured to the shell adjacent the same portion to which the mouth of the bladder is positioned, with the free end of the guide member spaced from the free end of the bladder, and the rigid guide member has a central bore with lateral perforations to permit flow of fluid through the guide member, unless the perforations are small, extrusion of the bladder, when it presses against the central guide member, may occur with resultant rupture thereof and if the perforations are small, insufficient flow of fluid therethrough may result.

Where, to prevent extrusion of the bladder and permit sufficient flow of fluid, collars of porous material such as sintered bronze for example, as shown in U.S. Patent to Mercier No. 3,322,154, are positioned around the central guide member and snugly encompass the same, there will be adequate flow of fluid through the perforations in the central guide member and through the porous collars and extrusion of the bladder will be precluded. However, where the pressure vessel is used as a fluid transfer device and a large flow of fluid, such as water, is required through the associated port after the pressure vessel has been charged with such water, which deforms the bladder inwardly against the guide tube, and gas under high pressure is forced through the central guide tube and through the perforations therethrough and through the porous collars, to react against the inwardly deformed bladder and expand the latter to expel the water in the shell through the associated port, the gas will expand as it is emitted from the small openings in the porous collars.

In many applications of fluid transfer devices, large containers for a clean gas under high pressure such as filtered nitrogen, are not feasible due to the size limitations and weight of such containers to accommodate the large volume of gas required.

Where the ambient air is used as the gas and is compressed by a high pressure compressor, since in certain applications such as on shipboard, the ambient air may contain oil particles and dirt, if such contaminated compressed ambient air is forced through relating small apertures such as is present in porous collars, as the air expands after it passes through the small apertures in the porous collars, a mist will be formed which contain volitilized oil particles in air. Since such oil-air mist is highly compressed in the closed chamber defined by the inwardly deformed bladder which yet defines a small volume, the resultant temperature increase will quickly reach the ignition temperature with likelihood of explosion.

In French patent application No. 2,550,283, published Feb. 8, 1985, and in European patent application No. 0,134,738 published Mar. 20, 1985, in order to permit sufficient flow of air through a perforated guide tube without extrusion of the bladder when the pressure vessel is initially charged with water exteriorly of the bladder therein, which fluid is subsequently expelled by rapidly expanding the bladder with air under high pressure through the guide tube and the perforations thereof, there is employed a series of independent annular deformable closure members all of which encompass the guide tube and provide a series of circular passageways between adjacent closure members which are claimed to function to permit escape of air from the bladder to vent the same through the guide tube and close when the bladder presses thereagainst, yet which open when air under pressure is forced through the passageway into the bladder.

With such construction upon initial filling of the pressure vessel exteriorly of the bladder with fluid such as water, a rapid build up of air pressure in the bladder as it is deformed inwardly, as the pressure vessel is charged, may cause the flexible material of the closure member to deform inwardly to close the passageways. This would prevent further charging of the pressure vessel with liquid so that it could not serve its intended purpose of providing a large supply of liquid under pressure to rapidly operate an actuator for example.

It is accordingly, among the objects of the invention to provide a pressure vessel of the above type and particularly one used as a fluid transfer device, which has a rigid perforated central guide member positioned in the bladder thereof, which during charging of the pressure vessel with fluid exteriorly of the bladder, precludes the bladder from twisting with resultant formation of sharp folds therein, and which with a simple low cost arrangement precludes extrusion of the inwardly deformed bladder through the perforations in the central guide member, yet which permits complete filling of the pressure vessel with fluid and also permits substantially unrestricted flow of highly compressed air through the guide tube into the interior of the bladder without formation of an oil-air mist, so that even with compression of the contaminated air in the closed chamber defined by the deformed bladder, no auto-ignition with resultant explosion will occur.

According to the invention these objects are accomplished by the arrangement and combination of elements hereinafter described and particularly recited in the claims.

In the accompanying drawings in which is shown one of various possible embodiments of the several features of the invention.

FIG. 5 is an enlarged detailed sectional view with parts broken away showing the mode of operation of the flexible closure member.

FIG. 6 is a view similar to FIG. 5 showing another mode of operation of the flexible closure member.

FIG. 7 is a schematic view showing an application of the device.

Figure 1:
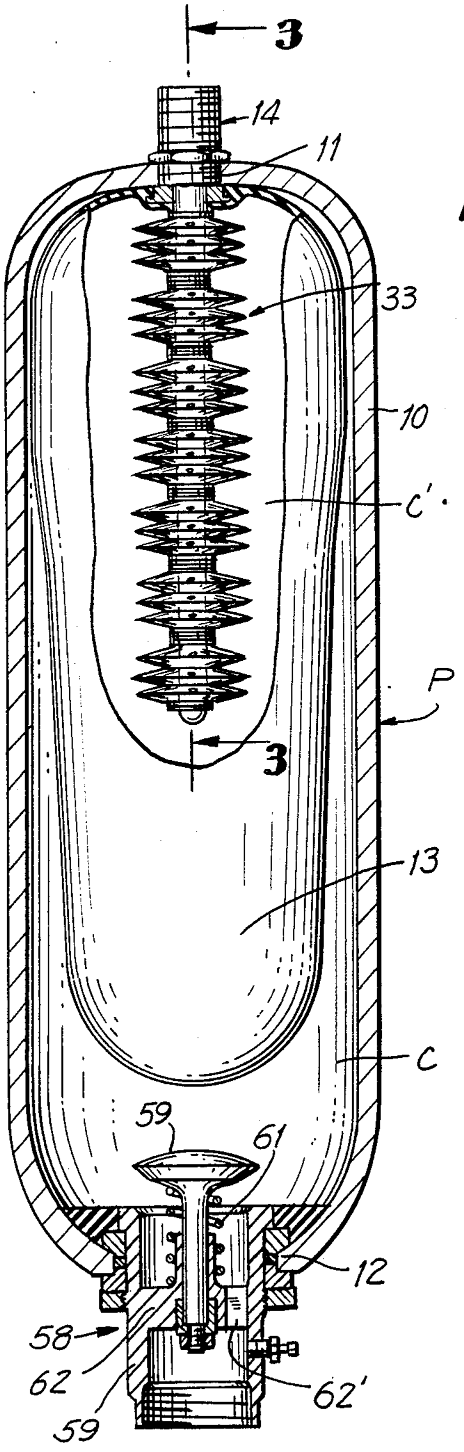
FIG. 1 is a longitudinal sectional view of one embodiment of the invention with parts broken away.

Referring now to the drawings, as shown in FIG. 1, the pressure vessel comprises a container or shell 10 of strong rigid material such as steel, cast aluminum of the like, capable of withstanding high pressure and having a pair of ports 11 and 12 preferably axially aligned at opposed ends thereof.

The container 10 may be spherical or cylindro-spherical as shown and has a partition 13 therein intervening between said ports 11 and 12, defining a variable volume chamber on each side, i.e. a chamber C exteriorly of the bladder for a fluid such as water, and a chamber C′ interiorly of the bladder for a second fluid such as gas.

The partition 13 preferably is a collapsible and expansible bladder of resilient material such as rubber or synthetic plastic of like physical characteristics, which in distended but substantially unstretched condition is smaller than the cavity of the container 10 and has its longitudinal axis aligned with the ports 11 and 12.

The bladder 13 is securely affixed in the container 10 preferably by means of a fitting 14 (FIG. 3) which desirably has a substantially cylindrical stem portion 15 with a base disc 16 presenting an outstanding lateral flange 17 which desirably has an annular groove 18 in its upper face in which may be positioned the thickened rim 19 about the mouth of bladder 13.

Thus with the stem portion 15 positioned in port 11 and protruding beyond the latter, when a nut 21 screwed on the protruding portion of stem 15 is tightened, the rim 19 of the bladder 13 will be clamped between flange 17 and the adjacent wall of the container 10, securely to hold the rim 19 in place, an annular shoulder 23 adjacent the root end of stem 15 abutting against the periphery of port 11 to prevent cutting of the rim 19 of the bladder by excessive tightening of nut 21.

The bore 24 of fitting 14 has an enlarged diameter portion defining an annular shoulder 25 on which is seated the flanged end 26 of an elongated rigid tube 27 which may be of steel, for example. The tube may be securely retained in position as by a snap ring 28 seated in an annular groove 29 in the bore 24 of fitting 14.

The tube 27 which is of length less than the length of the container 10, has a rounded plug 30 in its free end and has a plurality of longitudinally spaced radial perforations 31 through the wall thereof which lead into the bore 32 of the tube.

Figure 2:
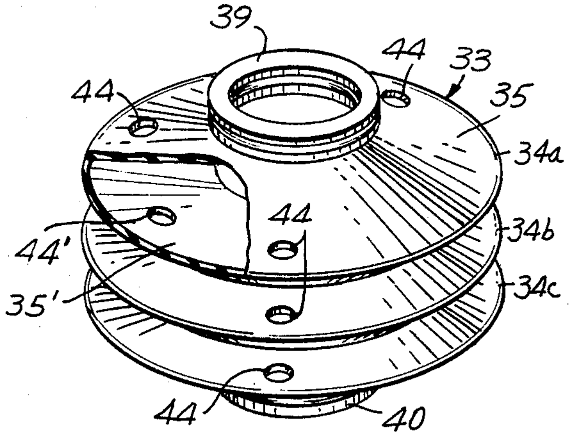
FIG. 2 is a perspective view of a flexible closure member according to the invention.
Figure 3:
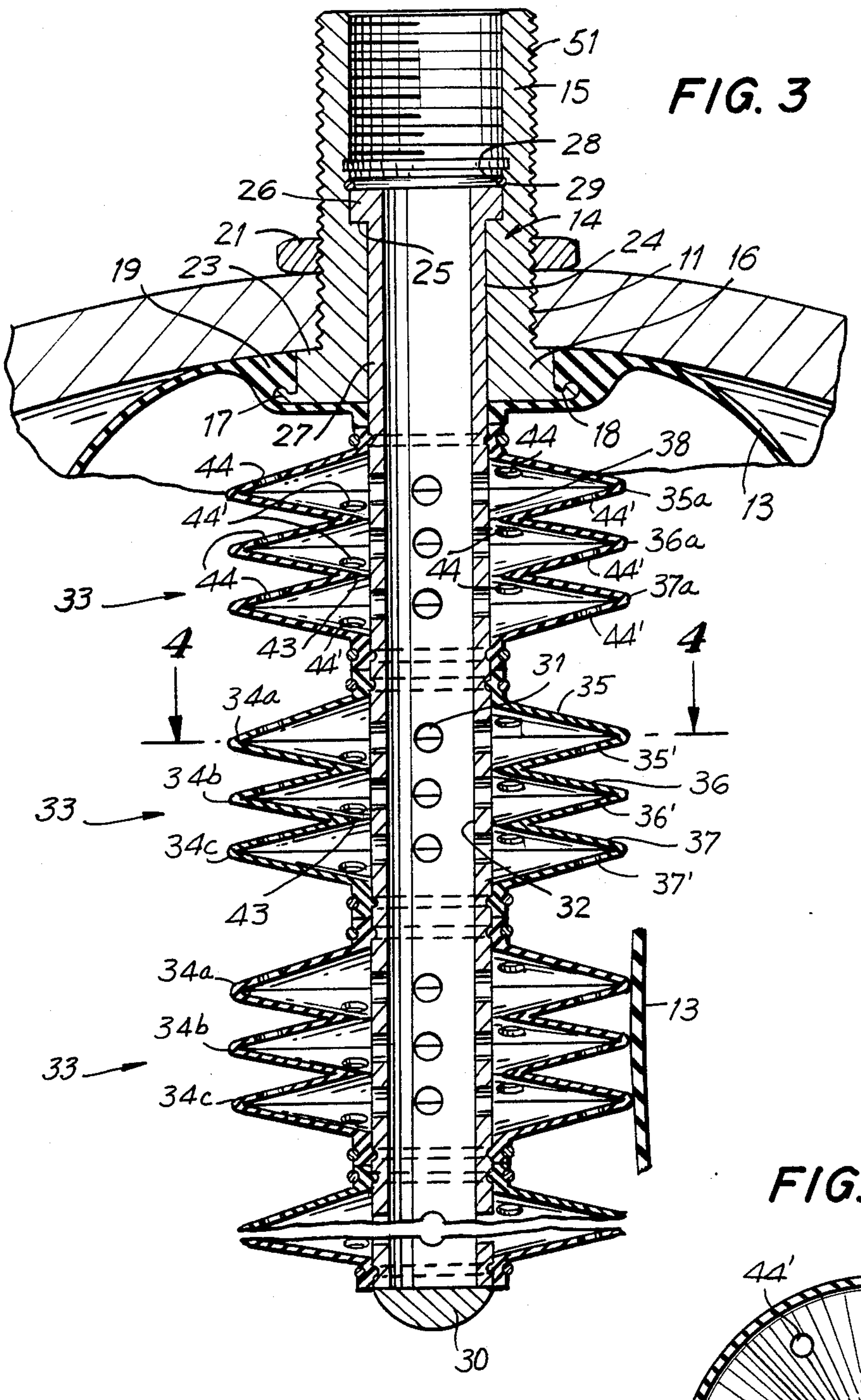
FIG. 3 is a detailed fragmentary view on an enlarged scale showing the central guide tube and flexible closure member.

Encompassing the length of the tube 27, is a plurality of flexible closure members 33. As shown in FIGS. 2 and 3, for example, each of the closure members is illustratively in the form of a bellows of flexible material less stretchable than the material of the bladder 13 thereby allowing larger apertures in the wall of the guide tube without extrusion of the bellows therethrough.

Each bellows has a plurality of convolutions, preferably three in number, designated 34*a*, 34*b* and 34*c*. Each convolution defines a pair of walls 35 and 35′, 36 and 36′ and 37 and 37′, joined at their outer extremity as at 35*a*, 36*a* and 37*a*.

The outer walls 35 and 37′ of the convolutions 34*a* and 34*c* extend inwardly from the respective outer extremities 35*a* and 37*a* to substantially the outer surface 38 of the guide tube 27 and each of the walls 35,37′ has an outwardly extending flange 39,40 which snugly encompasses the outer surface 38 of guide tube 27.

In order to prevent longitudinal movement of the flanges 39 and 40 along the guide tube 27, each of the outer surfaces of flanges 39 and 40 has an annular groove 41 in which is positioned an "O" ring 42 securely to retain the associated flange in position forcing a portion of the flange material into an associated annular groove 42′ in tube 27.

The reversely bent inner ends 43 of the adjacent wall surfaces 35′; 36 and 36′ and 37, extend substantially to the outer surface 38 of the central guide tube 27.

With the construction of the bellows above described, it is apparent that the associated pairs of walls of each of the convolutions 34*a*, 34*b* and 34*c* flare outwardly from the extremities 35*a*, 36*a* and 37*a* thereof toward the surface 38 of guide tube 27.

As shown in FIGS. 2 and 3, for example, at least one of the walls of each of the convolutions 34*a*, 34*b* and 34*c* and preferably both walls each has a plurality of apertures or passageways 44,44′ therethrough, which may be formed during molding of the bellows or subsequently punched out after the bellows is formed.

Figure 4:
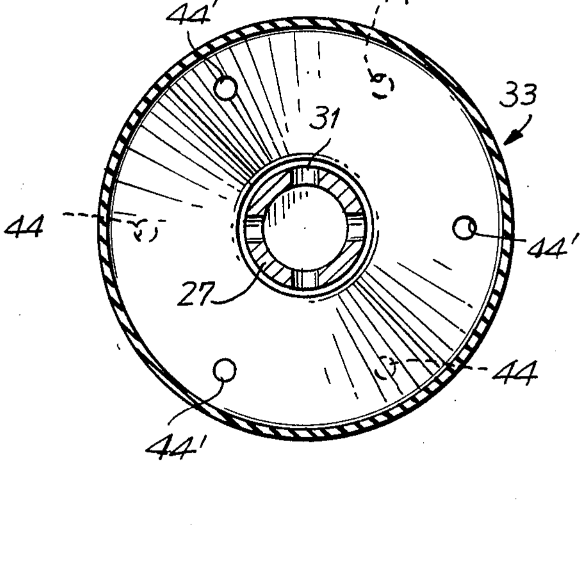
FIG. 4 is a transverse sectional view taken along line 4—4 of FIG. 3.

More particularly, as illustratively shown in FIG. 4, there are three apertures 44 in outer wall 35 of convolution 34*a* which illustratively are equidistantly, circumferentially spaced from each other.

There are also preferably three apertures 44′ in the inner wall 35′ of convolution 34*a* which are also equidistantly circumferentially spaced from each other and illustratively displaced 60° from the associated aperture 44.

This arrangement is repeated with the convolutions 34*b* and 34*c* with the result that the apertures 44, for example, in wall 35 of convolution 34*a* will be aligned with the unapertured or solid portion of the associated wall 35′.

As clearly shown in FIGS. 2 and 3, the apertures 44 and 44′ are adjacent the extremities 35*a*, 36*a* and 37*a* of each of the convolutions 34*a*, 34*b* and 34*c*.

In the illustrative embodiment shown in FIGS. 1 and 3, seven flexible closures members or bellows 33 are provided, although more or less could be provided depending upon the length of the central guide tube 27.

The bellows 22 is of sufficient rigidity so that it will normally be in the shape shown in FIG. 3, yet may have the walls thereof folded inwardly against the guide tube 27 when the bladder reacts thereagainst as shown in FIG. 5, or the walls may progressively deform outwardly as shown in FIG. 6.

In one illustrative use of the device shown in FIG. 7, the pressure vessel P has the threaded outer end 51 of fitting 14 connected by a conduit 52 to port 53 of a solenoid controlled valve 54. The valve 54 has a port 55 which defines a gas bleed to vent the gas and another port 56 which is connected by a conduit 57 to a high volume source of gas under high pressure, such as an air compressor. The valve 54 is normally in position to connect ports 53 and 55 and when actuated will close port 55 and connect port 53 to gas inlet port 56.

The port 12 of the container 10 has a conventional poppet valve assembly 58 therein of the type illustratively shown in U.S. Pat. No. 3,148,705.

As shown in FIG. 1, the assembly 58 includes a fitting 59 secured in port 12, which slidably mounts a poppet valve 59 normally urged to open position by a spring 61. The spider 62 of fitting 59 has passageways 62' therethrough to permit flow of a liquid such as water into and out of chamber C of the pressure vessel P when the poppet 59 is in open position.

As illustratively shown in FIG. 7, the outer end of fitting 59 is connected by conduit 63 through one-way valves 64 and 64', to the outlet 66 of pump 67 driven by a motor 68, the inlet 69 of pump 67 being connected to a reservoir 71 for a liquid such as water, an accumulator 80 being connected between the valves 64 and 64'.

The fitting 58 is also connected by conduit 73 to the port 75 of a solenoid actuated valve 76, the port 77 of said valve 76 being connected by conduit 78 to the work, illustratively an actuator to control a valve.

In the operation of the device and associated system with valve 76 in closed position, to disconnect ports 75 and 77, the valve 54 is in position connecting ports 53 and 55 to bleed the gas from chamber C'.

The pump 67 is actuated to force fluid from the reservoir 71 under a relatively low pressure of say, 200 psi, through one-way valves 64' and 64 into fitting 58 of the pressure vessel P to charge chamber C with water, accumulator 80 maintaining the low pressure on the water in chamber C and in the associated conduits before use.

The pumping action may take considerable time to fully charge chamber C and the pump 67 preferably associated with accumulator 80, is designed to maintain the full liquid volume in the pressure vessel before usage of the device.

Since valve 76 is closed, no water will pass through the valve at this time.

It is to be noted that during the course of charging the chamber C with liquid, as the chamber C progressively fills, it will cause the bladder 13 to be deformed inwardly, any residual gas in the bladder 13 escaping through the apertures 44 and 44' in the bellows 33 which are in their normal expanded shape as shown in FIG. 1, and through the apertures 31 in the guide tube and through conduit 52 and the connected ports 53,55 to bleed the gas from the bladder.

In view of the guide tube 27, no sharp folds will be formed in the deformed bladder 13 and the guide tube 27 will prevent the bladder from rubbing against the inner surface of the shell 10.

As the chamber C approaches its fully charged condition, the bladder 13 as shown in FIG. 3 will press or react against the outwardly extending ends 35*a*, 36*a*, 37*a* of the deformable closure members or bellows 33. However, upon initial contact of the bladder with such ends 35*a*, 36, 37*a*, as shown in FIG. 3, the apertures 44,44' in the walls of the bellows will be open to permit ready flow of gas therethrough to permit further charging of chamber C to its maximum capacity.

With further inward movement of the bladder 13, the reaction of the bladder against the ends 35*a*, 36*a* and 37*a*, as shown in FIG. 5, will cause each of the convolutions 34*a*, 34*b* and 34*c* to fold inwardly restricted by abuttment against tube 27, causing portions of the associated pairs of walls of each convolution to press against each other.

As a result of the displacement of the apertures 44 with respect to the apertures 44' in the associated pair of walls, it is apparent that when the chamber C is filled to its maximum capacity and the bladder 13 presses snugly against the closure members 33, each aperture 44 for example, in the wall 35, will be pressing against and aligned with a solid portion of the associated wall 35'. Consequently, extrusion of the bladder through the apertures 44 is precluded and consequently the bladder cannot extrude through apertures 31 in the guide tube as will be more fully hereinafter described.

When chamber C is fully charged valve 54 is actuated to close all of its ports.

The device hereinabove set forth is particularly intended to be used as a transfer device, i.e. it transfers the liquid previously charged into chamber C to an actuator to rapidly operate a large gate valve for example.

To secure a large flow of liquid, high pressure valve 54 is actuated to connect conduit 52 through port 53,56 and conduit 57 to an air supply which supplies a large volume of air at high pressure, say a pressure of 5000 PSI. Thereupon, valve 76 (which leads for example to an actuator) is operated allowing the fluid stored in chamber C to flow through conduit 73, connected ports 75,77 to the device to be actuated.

Thus, there will be a sudden flow of a large quantity of air under high pressure into the guide tube 27 and such air will pass through the apertures 31 into the associated bellows 33. Consequently, the bellows 33 will freely deform from the position shown in FIG. 5 to a position such as is shown in FIG. 6. Such deformation of the bellows will cause the apertures 44 and 44' to become fully exposed so that the air may readily flow therethrough into the chamber C' of the bladder 13 rapidly to expand the bladder, causing the water in chamber C to be quickly ejected from the pressure vessel through conduit 73 and ports 75, 77 of valve 76 and conduit 78 to the device to be actuated.

It is important to note that the sum S-1 of the areas of the apertures 44,44' in the flexible closure members 33 is greater than the sum S-2 of the areas of the apertures 31 in the guide tube 27 which sum S-2 in turn is greater than the cross sectional area S-3 of the bore 32 of the guide tube 27.

As a result of this arrangement it is apparent that there will be no restriction of the flow of gas with associated pressure drop from the bore of guide tube 27 into the chamber C' in bladder 13 since the gas is passing through larger and larger apertures.

Consequently, since the gas flow into the bladder is not restricted, no oil-gas mist will be created in the bladder which avoids the possibility of auto-ignition, with resultant explosion. More particularly, if a sintered metal sleeve was provided as disclosed in Patent No. 3,322,154, the oil-air mist formed due to the restriction of flow of the gas therethrough, when subjected to high compression could cause an auto-ignition to occur.

The transfer device above described is particularly useful in mobile applications such as on shipboard where clean air is not generally available and more particularly when large valves must be rapidly controlled, such as for reactor emergency procedures.

As many changes could be made in the above construction and many apparently widely different embodiments of this invention could be made, such as for use in a tubular transfer device, without departing from the scope of the claims, it is intended that all matter contained in the above description or shown in the accompanying drawings shall be interpreted as illustrative and not in a limiting sense.

Having thus described the invention and illustrated its use, what is claimed as new and is desired to be secured by Letters Patent in the United States is:

1. A pressure vessel comprising a rigid container having a deformable partition therein defining two chambers for fluids, each having a fluid port leading thereinto, an elongated central guide member for said partition in one of said chambers, said central guide member comprising a rigid tube extending axially in said container having at least one end secured to one of said ports, said tube having apertures therethrough, a flexible closure member encompassing said tube and the apertures thereof, said closure member having a plurality of closure elements normally extending radially outward from said tube, each closure element comprising a pair of spaced walls joined at their outer ends, one of said walls having apertures therethrough, whereby when said partition is forced inwardly against said flexible closure member to force said flexible closure member against said tube, an apertured portion of one of said walls will be aligned with an uninterrupted portion of an associated wall to prevent extrusion of said partition through the apertures in said tube.

2. The combination set forth in claim 1 in which said partition is a deformable bladder and said guide tube extends into said bladder.

3. The combination set forth in claim 1 in which a plurality of flexible closure members encompass said tube.

4. The combination set forth in claim 1 in which the partition is of resilient deformable material and the closure members is deformable but of more rigid material than the material of the bladder.

5. The combination set forth in claim 1 in which the area of the bore of said tube is less than the sum of the areas of the apertures in said tube, which sum is less than the sum of the areas of the apertures in said closure elements.

6. The combination set forth in claim 1 in which the flexible closure member is a bellows having a plurality of convolutions, each convolution defining a pair of walls, each pair of walls being joined at their outer extremities, said walls extending inwardly to substantially the outer surface of said guide member.

7. The combination set forth in claim 1 in which the apertures in said flexible closure member are positioned nearer the joined outer ends of said walls.

8. The combination set forth in claim 1 in which each of said walls has apertures therethrough, the apertures in one of said walls being angularly displaced from the apertures in the other of said walls.

9. The combination set forth in claim 1 in which said flexible closure member is a bellows, said bellows having a plurality of convolutions, each convolution having an associated pair of walls.

10. The combination set forth in claim 9 in which each end of the bellows has a bore of diameter substantially the same as the outer diameter of the tube snugly to encompass the latter.

11. The combination set forth in claim 9 in which the bellows has a bore extending therethrough, opposed ends of the bellows bore being of diameter substantially the same as the outer diameter of the tube snugly to encompass the later.

12. The combination set forth in claim 11 in which means are provided to restrain axial and radial movement of the ends of the bellows encompassing the tube.

* * * * *